United States Patent [19]
Medsker

[11] Patent Number: 5,931,507
[45] Date of Patent: Aug. 3, 1999

[54] ROTARY JOINT WITH BODY LOCK SYSTEM

[75] Inventor: James A. Medsker, Lawton, Mich.

[73] Assignee: The Johnson Corporation, Three Rivers, Mich.

[21] Appl. No.: 08/929,456

[22] Filed: Sep. 15, 1997

[51] Int. Cl.[6] ................................................. F16L 27/08
[52] U.S. Cl. .......................... 285/39; 285/278; 285/280; 285/282
[58] Field of Search ............................ 285/39, 272–282, 285/184

[56] References Cited

U.S. PATENT DOCUMENTS

| | | | |
|---|---|---|---|
| 925,959 | 6/1909 | Smith | 285/280 |
| 1,069,146 | 8/1913 | Kennedy | 285/280 |
| 1,629,650 | 5/1927 | Brauer | 285/280 |
| 2,414,997 | 1/1947 | Atkins | 285/278 |
| 2,580,626 | 1/1952 | Warren | 285/281 |
| 2,710,204 | 6/1955 | Faith-ell | 285/278 |
| 2,751,767 | 6/1956 | Hedden | 285/281 |
| 2,935,338 | 5/1960 | Mills | 285/277 |
| 3,124,373 | 3/1964 | Thomsen | 285/282 |
| 4,239,262 | 12/1980 | Krupp et al. | 285/282 |

FOREIGN PATENT DOCUMENTS

| | | | |
|---|---|---|---|
| 857179 | 12/1960 | United Kingdom | 285/282 |

*Primary Examiner*—Eric K Nicholson
*Attorney, Agent, or Firm*—Young & Basile, P.C.

[57] ABSTRACT

A rotary joint for establishing fluid tight communication between a rotating drum and a heating or cooling medium such as steam or water wherein the joint includes a normally stationary body connected to supply or discharge conduits, and the body includes a rotating nipple coaxially threaded into the end of the drum. For ease of installation, maintenance and removal, the normally relatively rotatable body and nipple are selectively locked together to prevent relative rotation permitting rotation of the body to thread or unthread the nipple relative to the drum journal.

10 Claims, 3 Drawing Sheets

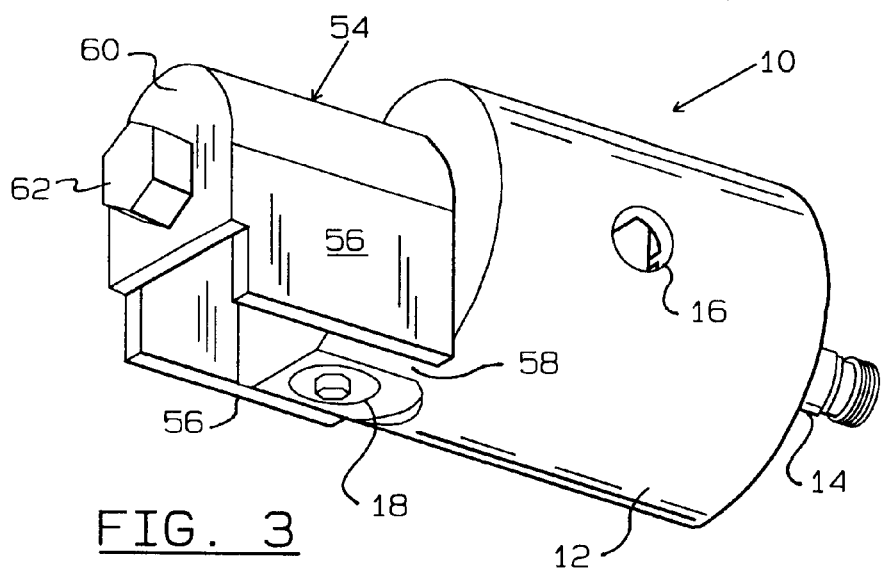
FIG. 3
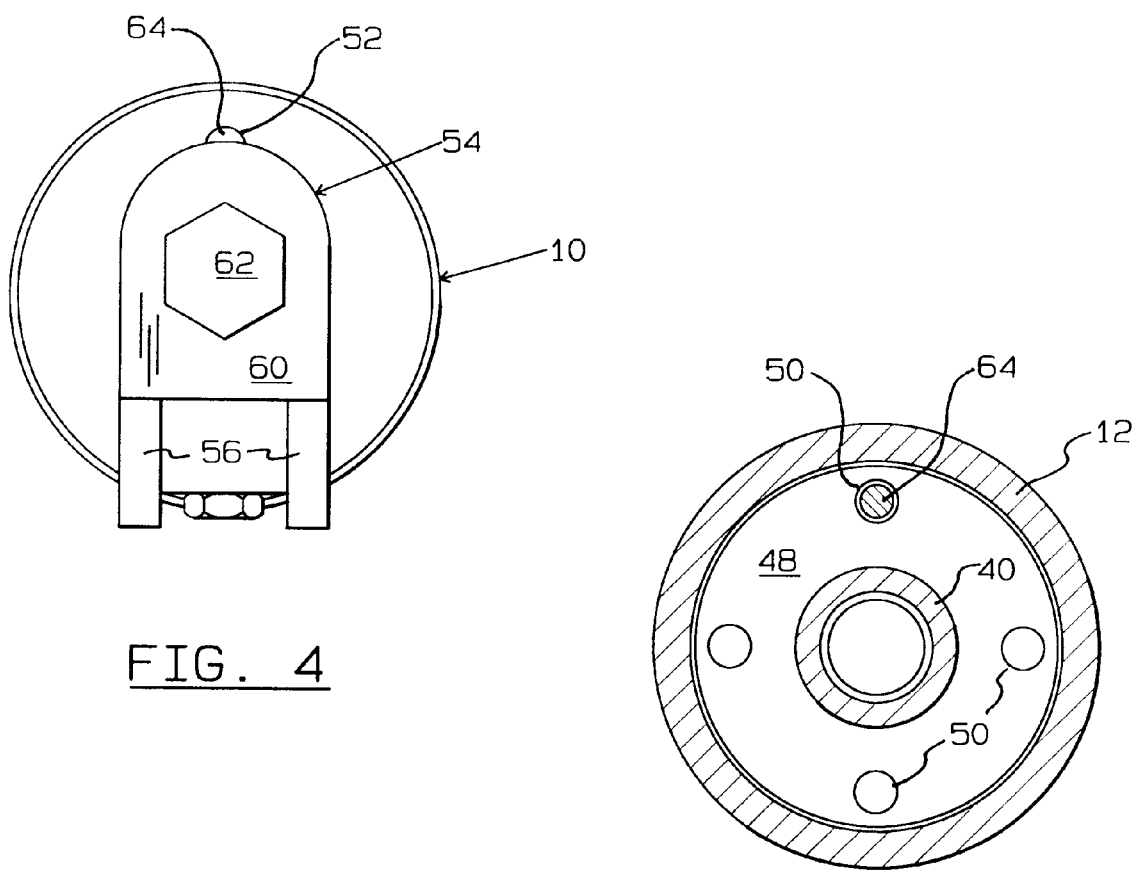
FIG. 4
FIG. 5

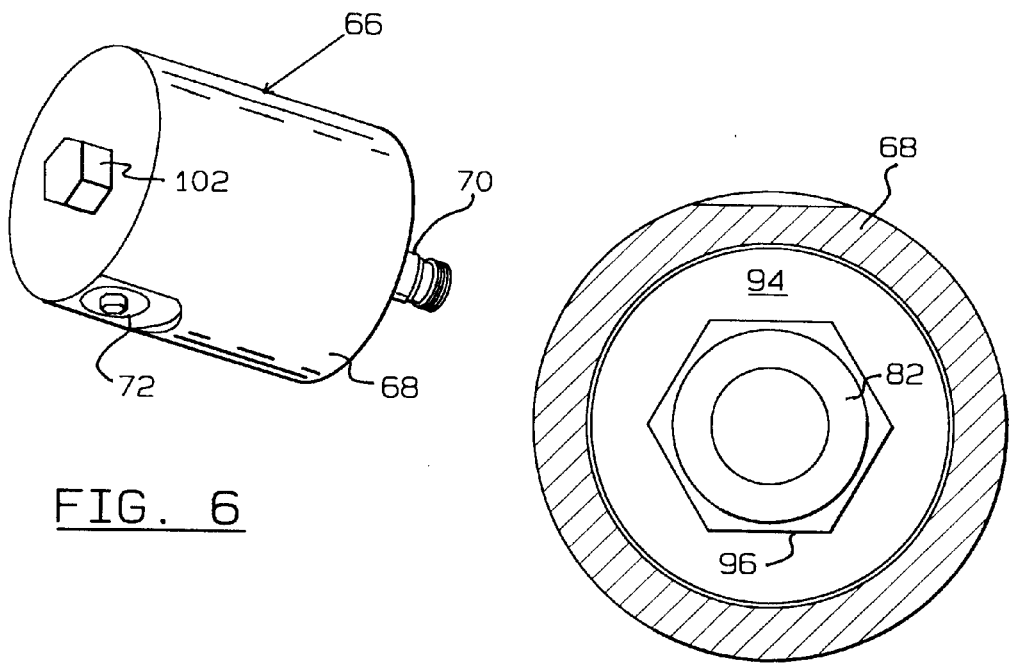
FIG. 6
FIG. 8
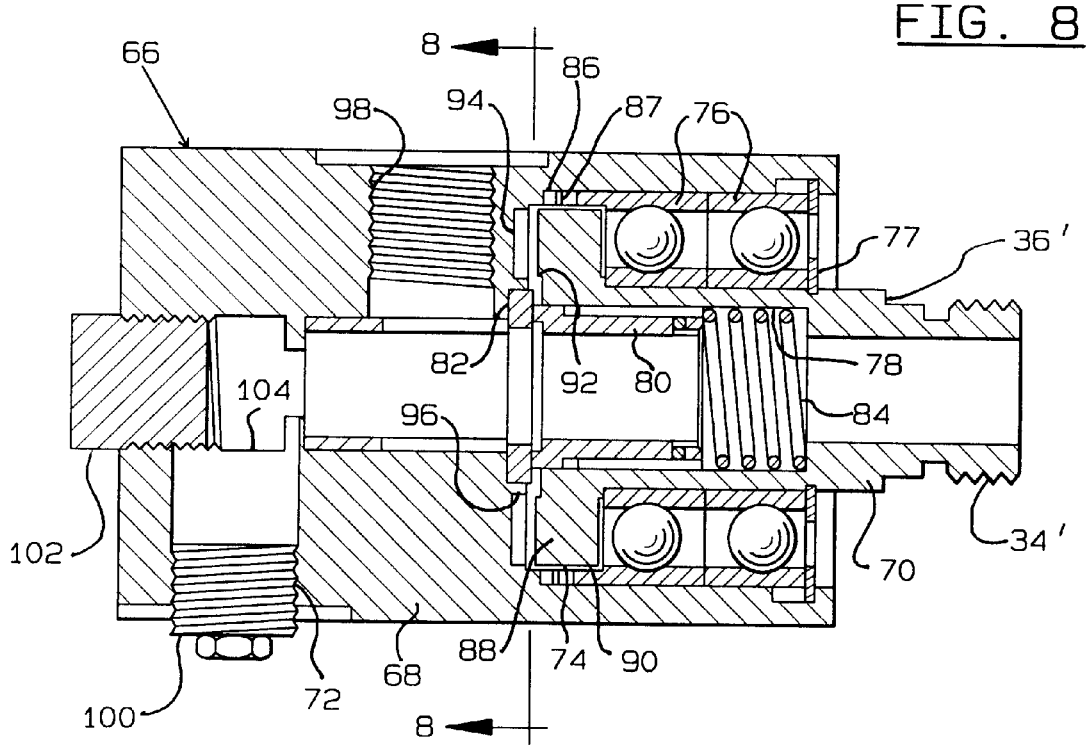
FIG. 7

ROTARY JOINT WITH BODY LOCK SYSTEM

BACKGROUND OF THE INVENTION

1. Field of the Invention

The invention pertains to rotary joints of the type used to introduce or remove steam, water or the like into or from a rotating heating or cooling drum such as utilized in the paper, paperboard and fabric web fabricating arts.

2. Description of the Related Art

Rotary joints have long been used to introduce steam into rotating drums of the type employed in the paper making arts, and such joints may simultaneously introduce steam and remove the condensate. Likewise, rotary joints are employed to introduce and remove water from drums used for cooling purposes. The rotating drums in paper making mills are usually of a large diameter, three or four feet in dimension, and such drum size permits the rotary joints of adjacent drums to be spaced apart by several feet providing sufficient clearance between adjacent joints to provide access and permit joints to be disassembled or otherwise serviced. However, large printing installations employ relatively small rollers which are temperature controlled by fluid medium introduced into the drums or rollers, and as the drums are of small diameter, the rotary joints of adjacent drums must, necessarily, be in close proximity to each other.

Rotary joints in close proximity to each other are very difficult to service in that the necessary conduits supplying the joint with medium, or removing used medium therefrom, cause the access to such joints to be limited significantly complicating joint removal or installation, servicing and removal procedures. In the past, in those installations where rotary joints must, necessarily, be closely spaced together, it is necessary to utilize nipples and other joint structure of different lengths to "stagger" joints, and other compromises of installation are utilized to overcome the lack of space. As previous rotary joint constructions require at least partial disassembly of the body to permit the body and nipple to be removed, or if the nipple is mounted with a quick-connect fitting on the drum journal, a lack of accessibility to the joint structure significantly complicates joint servicing. While a quick-connect attachment of the nipple to the drum journal simplifies joint removal if adequate clearance between adjacent joints is available, such type of nipple connection is of little advantage in closely confined installations in that the quick-disconnect structure is located between the joint body and the drum, and the joint body limits access to the quick-disconnect nipple coupling.

OBJECTS OF THE INVENTION

It is an object of the invention to provide a rotary joint construction which may be utilized in close confinement installations, and wherein a rotary joint may be removed from a drum journal quickly and easily without damage to the rotary joint, and without necessitating access to nipple/drum journal couplings.

Another object of the invention is to provide a rotary joint for rotating drum journals wherein the joint may be firmly coaxially fixed to the drum journal in a liquid transmitting relationship and no access to the structure is required between the joint body and drum journal.

An additional object of the invention is to provide a rotary joint having a nipple rotatably mounted therein wherein the joint body and nipple may be selectively locked in a non-rotative relationship whereby rotation of the joint body will rotate the nipple to facilitate attachment or removal of the nipple in a coaxial manner to a drum journal.

Yet another object of the invention is to provide a rotary joint having a rotatable nipple adapted to be threaded into a drum journal whereby the joint body and nipple may be selectively locked in a non-rotative relationship, and the joint body includes torque transferring structure to permit a rotative torque to be applied to the joint body permitting the nipple to be installed onto or removed from the drum journal.

SUMMARY OF THE INVENTION

The concepts of the invention are utilized with a rotary joint having a nipple and shoulders defined at its outer end whereby the nipple may be coaxially threaded into a bore defined in a rotating drum journal such as shown in the assignee's U.S. Pat. No. 5,303,959. As will be appreciated from the foregoing patent, rotation of the rotary joint nipple permits the nipple to be mounted upon the drum journal in a strong mechanical connection which is fluid tight. However, in previous nipple constructions of this type, it has been necessary to have access to the nipple in order to impose the necessary torque thereto for threading or unthreading the nipple relative to the drum journal.

In the practice of the invention, means are employed to selectively lock the joint body and nipple against relative rotation about the nipple axis. In this manner, locking of the joint body and nipple together will permit rotation of the joint body, to rotate the nipple and permit it to be threaded into, or removed from, the drum journal bore. By utilizing torque transfer structure on the rotary joint body, the joint body may be rotated in either direction by the use of a conventional wrench, or the like, and no access to the joint/drum assembly intermediate the joint and drum is required for joint maintenance.

The joint body and nipple may be interlocked in a torque transferring relationship by a wide variety of structure, two of which are shown in the drawings later described. In one disclosed embodiment, the nipple is provided with a radial flange having an opening therein radially spaced from the nipple axis of rotation, and a hole formed in the joint body in alignment with the nipple opening permits a key or pin to be inserted into the body hole and into the nipple opening locking the body and nipple together.

In the foregoing arrangement wherein a key or pin is inserted through a body hole, the key may be mounted upon a torque member which is temporarily placed upon the joint body in a torque transferring relationship and this torque member may include a hexagonal head whereby the mounting of the torque member upon the joint to locate the key within the nipple opening also locks the wrench member upon the joint body whereby a wrench applied to the hex head permits simultaneous rotation of the torque member, joint body and nipple about the nipple axis to permit the nipple to be threaded into, or removed from, the drum journal bore.

In another disclosed embodiment of the invention, detent structure is internally formed within the joint body for selective engagement with a detent mounted upon the nipple. A spring normally maintains the body and nipple detents disengaged from each other to permit rotation of the nipple relative to the body during normal rotary joint operation. However, when it is desired to rotate the nipple by rotating the body, the body is axially displaced toward the nipple compressing the spring permitting the body and nipple detents to engage locking the body and nipple against relative rotation. In this embodiment, a hexagonal wrench engaging head may be coaxially mounted, or molded, upon the joint body in alignment with the nipple axis.

Of course, it will be appreciated that although the concepts of the invention are of particular advantage in rotary joints mounted in close proximity to each other, and in those situations where clearance and access is limited, the inventive concepts may be employed with any rotary joint and type of installation wherein the nipple is threaded into a drum journal bore.

BRIEF DESCRIPTION OF THE DRAWINGS

The aforementioned objects and advantages of the invention will be appreciated from the following description and accompanying drawings wherein:

FIG. 3 is an exterior perspective view of the rotary joint and torque member in assembled relationship as shown in FIG. 2, FIG. 4 is a rear elevational view as taken from the left of FIG. 3, FIG. 5 is an elevational sectional view taken along Section 5—5 of FIG. 2, FIG. 6 is a perspective view of a rotary joint utilizing an interior body/nipple locking structure, FIG. 7 is a diametrical elevational sectional view of the embodiment of FIG. 6 wherein the joint body/nipple components permit an interior locking thereof, the components being shown in the disengaged relationship, and FIG. 8 is an elevational sectional view as taken along Section 8—8 of FIG. 7 illustrating the configuration of the joint body detent non-circular recess.

DESCRIPTION OF THE PREFERRED EMBODIMENTS

Figure 1:
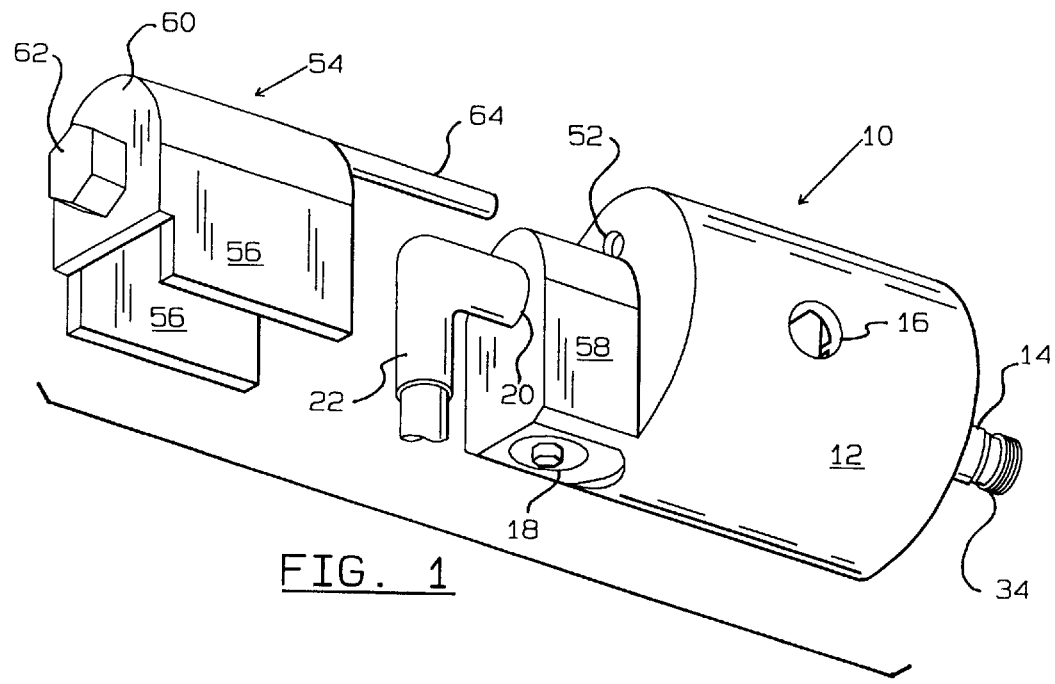
FIG. 1 is a perspective exploded view of a rotary joint and torque member utilizing the concepts of the invention.

With reference to FIG. 1, a rotary joint is disclosed with the inventive concepts at 10, and the joint includes a generally cylindrical body 12. A nipple 14 extends from the inner end of the body 12 as will be later appreciated.

The body 12 is provided with ports 16 and 18 as well as a concentric port 20 whereby conduits to supply the heating or cooling medium, as is well known, may be supplied to the interior of the body 12, or removed therefrom, as by a syphon system or the like. In FIG. 1, a conduit 22 is illustrated as attached to the outer end port 20.

Internally, the body 12 includes a chamber 24 which intersects the body inner end. The chamber 24 includes a pair of ball bearings 26 held within the chamber by an annular retainer 28. The retainer 28 is located adjacent the nipple inner end 30, while the nipple outer end is represented at 32.

Joint 10 is concentrically mounted upon the end of the journal of a heat transfer drum, not shown, during operation. Such drums are commonly used in the paper, cardboard, and fabric arts, as is well known wherein such drums are used to heat, or cool, a web of indeterminate length passing over the periphery of the rotating drums. For instance, steam introduced into a rotating drum in a paper mill is used to remove moisture from the paper web passing thereover, and the rotary joint is used to introduce steam for heating purposes, and also may be employed to remove steam condensate from the drum.

The outer end of the nipple 14 is threaded at 34, and the nipple end includes an end shoulder 36 which cooperates with a complementary radial shoulder on the journal end whereby with the use of annular resilient seals, a firm fluid tight connection may be made between the joint 10 and the drum journal as the nipple end 30 is threaded into the axial journal bore as shown in U.S. Pat. No. 5,303,959.

The nipple 14 is tubular and includes an enlarged diameter bore 38 in which a sleeve seal 40 is axially reciprocally mounted. The sleeve seal 40 includes an end which engages the annular seal 42 located within an annular recess within the body 12. An O-ring 44 surrounding the sleeve 40 seals the sleeve to the nipple, and a spring 46 located within bore 38 axially biases the sleeve against the seal 42 to maintain a fluid tight relationship between the nipple and the joint body 12.

The nipple 14, at its innermost end, includes a radially extending flange 48, and a plurality of axially extending openings 50 are defined within the flange 48. As will be appreciated from FIG. 5, four openings 50 may be formed in the flange.

The joint body 12 includes an axially extending hole 52 in alignment with the radial position of the nipple flange openings 50 whereby a key or pin inserted within the hole 52 is adapted to be received within a nipple flange opening 50.

In normal operation, the nipple 14 is threaded into the drum journal bore, and steam, or the like, introduced into the body 12 through the conduit 22 passes through the nipple into the journal. Of course, if the rotary joint is used for condensate removal purposes, the condensate will exit the dryer drum through the joint 10. Ports 18 and 20 may be plugged, if desired, and not used, or used in conjunction with supply or syphon conduits.

Figure 2:
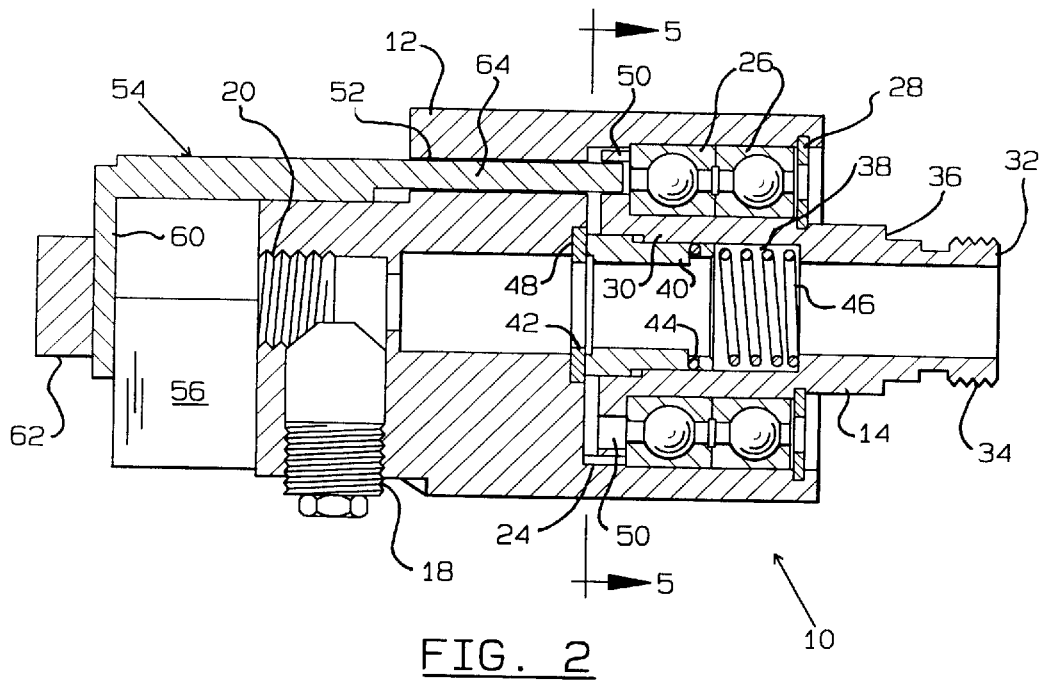
FIG. 2 is a diametrical sectional elevational view of the rotary joint and torque member of FIG. 1 shown in an assembled relation wherein the torque member key is received within the nipple flange opening.

When it is desired to practice the improvement provided by the invention, i.e. the rotation of the nipple 14 by the simultaneous rotation of the body 12, a torque member 54 is placed upon the outer end of the joint body 12. The torque member 54 includes spaced parallel legs 56 adapted to straddle and firmly engage the flats 58 formed upon the body exterior surface at the body outer end. Torque member 54 includes an end plate 60 upon which a hexagonal head 62 is welded. A key pin 64 is mounted upon the upper region of the torque member 54, FIG. 2, and is of sufficient axially extending length as to be received within the joint body hole 52 when the legs 56 of the torque member are placed upon the body flats 58, as shown in FIG. 2. When the key pin 64 is fully inserted into the body opening 52, the end region of the key pin 64 enters a nipple flange opening 50, FIG. 2, thereby locking the joint body and nipple against relative annular rotation about the axis of the nipple 14. A wrench may be applied to the hex head 62, and torque applied to the body. Of course, when it is desired to rotate the body 12, all conduits to the body, such as conduit 22, are removed therefrom so as not to impede body and nipple rotation. With the body 12 and nipple 14 locked together by the key pin 64, torque applied to the torque member 54 by a wrench transfers such torque to the body through the legs 56 and flats 58, and as the body 12 is rotated the nipple 14 is also rotated as to be threaded into, or removed from, the axial threaded hole in the drum journal, not shown. In this manner, the body 12 and nipple 14 may be easily rotated from the body outer end and it is not required to have access to the location adjacent the nipple outer end 32. By the utilization of the inventive concepts, a plurality of relatively large rotary joints can be mounted in close proximity in that no clearance access is required between the joint body and the drum journal, as is the usual case.

After the nipple 14 has been fully threaded into the journal bore, the torque member 54 is merely axially pulled from the outer end of the body 12 which simultaneously removes the key pin 64 from nipple flange opening 50 and the body hole 52 thereby releasing the nipple and joint body from each other permitting respective rotation during normal operation.

In the embodiment of FIGS. 6–8, components identical to those previously described are indicated by primed reference numerals.

In this embodiment of the invention, the joint 66 includes the cylindrical body 68 having a nipple 70 whose exterior configuration is identical to the nipple 14. A port 72 is defined in the body 68 in communication with the nipple 70. Interiorly, the body 68 includes the chamber 74 and a pair of ball bearings 76 are retained within the chamber 74 for rotatably supporting the nipple 70 with respect to the body 68. The bearings 76 are held in position by the retainer 77. The nipple bore 78 includes the tubular sleeve 80 sealingly engaging the annular seal 82, and the spring 84 forces the sleeve 80 into sealing engagement with the seal 82.

The body 68 is constructed to permit limited axial movement between the joint body and its nipple 70. To permit such movement, clearances 86 are defined in the body adjacent the bearing outer race and retainer 77. An annular wave spring 87 is located within the left bearing clearance 86, FIG. 7, and this wave spring tends to bias the joint body 68 to the left with respect to nipple 70, FIG. 7.

The nipple 70 includes a radially extending flange 88 at its innermost end and the flange 88 includes a circular periphery 90, and the flange 88 also includes a detent hexagonal surface 92. In opposition to the flange 88, the body 68 is formed with a recess 94 having an outer circular configuration, and an inner hexagonal surface 96 corresponding to the hexagonal surface 92 formed in the flange, as will be appreciated from FIG. 8. The detent surfaces 92 and 96 are biased away from each other by the wave spring 87. A port 98 may be defined in the body 68, FIG. 7, for communication with a supply medium, and a plug 100 may be used to plug the port 72, if desired. Of course, one of the ports 72 or 98 will be associated with either a medium supply or discharge conduit.

As it is desired to be able to rotate the body 68 about its axis which is coaxial with the axis of nipple 70, a hex head 102 is located on the rotary joint body 68 coaxial with the nipple axis. In the disclosed embodiment, the hex head 102 may be mounted upon a plug firmly threaded into the body port 104, or if desired, the hex head 102 may be directly cast or forged into the body 68.

During normal operation of the rotary joint 66, a supply, or discharge, conduit will communicate with the chamber 74 either through the port 72 or port 98. The nipple 70 will be firmly threaded into the end of the drum journal, not shown, and as the nipple detent surface 92 is not engaging the body detent surface 96, the body and nipple may freely relatively rotate during normal operation.

However, when it is desired to remove, or attach, the rotary joint 66 to the end of a drum journal, the conduits will be removed from the body 68, a wrench is applied to the hexagonal head 102 and axial force is applied to the body 68 to compress the wave spring 87. Such compression of the wave spring 87 permits the nipple hexagonal surface 92 to engage with the body hexagonal surface 96 and as these detent surfaces engage relative rotation between the body 68 and the nipple 70 is no longer possible. Accordingly, torque applied to the hexagonal head 102 will now rotate the nipple 70 permitting the nipple to be removed from, or attached to, the drum journal. Upon release of the axial force on the body 68, the detent surfaces 92 and 96 will separate again permitting free relative rotation between the body 68 and nipple 70.

It will be appreciated that a wide variety of locking arrangements are possible between the rotary joint body and its nipple, and only two types of keys or locks are shown. For instance, it would be possible to form a radial hole in the joint body 12 in alignment with the nipple flange, and notch the nipple flange periphery so that a pin could be radially inserted through the rotary joint body for engagement with the nipple flange to prevent relative body and nipple rotation.

It is appreciated that other embodiments to the inventive concepts may be apparent to those skilled in the art, and it is intended that the scope of the invention only be defined by the language of the following claims.

I claim:

1. A rotary joint for a heat transfer drum characterized by its ease of installation and removal relative to a drum journal comprising, in combination, a joint body having a longitudinal axis, an inner end, an outer end and an internal chamber, a port defined in said body in communication with said chamber, a tubular nipple within said chamber having an inner end in communication with said chamber and an outer end extending from said body inner end, screw threads defined on said nipple outer end for mounting said nipple and body upon a drum journal, bearings within said chamber rotatably mounting said nipple within said body, and means selectively locking said body and nipple against relative rotation whereby rotation of said body about its axis will rotate said nipple.

2. In a rotary joint as in claim 1 wherein said means selectively locking said body and nipple comprises key means radially spaced from said body axis.

3. In a rotary joint as in claim 2 wherein said key means includes an opening defined in said nipple, a key hole defined in said body and a key insertable within said key hole for reception within said nipple opening to lock said body and nipple against relative rotation about said body axis.

4. In a rotary joint as in claim 3 wherein said key comprises an elongated pin.

5. In a rotary joint as in claim 2 wherein said key means includes slidably engageable first and second elements defined on said body and nipple, respectively, and operating means within said body selectively permitting engagement and disengagement of said elements whereby engagement of said elements prevents relative rotation between said nipple and said body about said body axis and disengagement of said elements permits relative rotation between said nipple and said body about said body axis permitting normal operation of said rotary joint.

6. In a rotary joint as in claim 5, said operating means comprising a spring within said body biasing said elements from engagement, axial force applied to said body compressing said spring and permitting engagement of said elements.

7. In a rotary joint as in claim 3, a torque member having an axis, joint body engaging surfaces defined on said torque member whereby said torque member may be mounted on said body in non-rotative relationship thereto, wrench engaging means defined on said torque member substantially aligned with said axis thereof, said key being mounted upon said torque member whereby placing said torque member upon said joint body inserts said key within said body key hole and into said nipple opening wherein rotation of said torque member will simultaneously rotate said body and said nipple.

8. In a rotary joint as in claim 7 wherein said key comprises an elongated pin.

9. A rotary joint for a heat transfer drum characterized by its ease of installation and removal relative to a drum journal comprising, in combination, a joint body having a longitudinal axis, an inner end, an outer end and an internal chamber, a port defined in said body in communication with said chamber, a tubular nipple within said chamber having an inner end in communication with said chamber and an outer end extending from said body inner end, screw threads defined on said nipple outer end for mounting said nipple and body upon a drum journal, bearings within said chamber rotatably mounting said nipple within said body, a radially extending flange defined on said nipple within said chamber, an opening within said flange, and a hole defined in said body in alignment with said flange opening whereby insertion of a pin within said hole into said opening locks said body and nipple against relative rotation about said body axis permitting rotation of said body to rotate said nipple for attachment or removal to a drum journal.

10. A rotary joint characterized by its ease of installation and removal comprising, in combination, a joint body having a longitudinal axis, an inner end, an outer end and an internal chamber, a port defined in said body in communication with said chamber, a tubular nipple within said chamber having an inner end in communication with said chamber and an outer end extending from said body inner end, screw threads defined on said nipple outer end for mounting said nipple and body upon a drum journal, bearings within said chamber rotatably mounting said nipple within said body, a radially extending flange defined upon said nipple, an axially extending detent defined on said flange, a detent lock defined on said body in alignment with said detent, said nipple being axially displaceable within said chamber, a spring axially biasing said nipple flange away from said detent lock, axial force on said body compressing said spring and engaging said detent lock and detent to lock said body and nipple together with respect to rotation about said body axis, and wrench engaging means exteriorly defined on said body in alignment with said body axis for rotating said body and nipple upon being locked together.

* * * * *